Oct. 17, 1967     B. E. PICKERING     3,346,988

ELECTRICAL INSECT CATCHER

Filed March 1, 1965

United States Patent Office

3,346,988
Patented Oct. 17, 1967

3,346,988
ELECTRICAL INSECT CATCHER
Barry Ernest Pickering, Glebe, New South Wales, Australia, assignor to Henry Simon (Australia) Limited, Glebe, New South Wales, Australia, a corporation of Great Britain
Filed Mar. 1, 1965, Ser. No. 436,012
Claims priority, application Australia, Feb. 28, 1964, 41,448/64
4 Claims. (Cl. 43—112)

ABSTRACT OF THE DISCLOSURE

An electrical insect catcher equipped with a frame supporting a substantially vertical electrified grid and the source of light of short waves attractive to flying insects. Said electrified grid and the short-wave light source being supported from elements of the said frame which frame also supports a cowling for housing the electrical activating means and connections associated with the grid and the light source and a removable tray. The frame also supports a reflective corrugated aluminum surface so arranged that light from the short-wave light source is reflected and scattered so as to pass the electrified grid.

---

Figure 1:
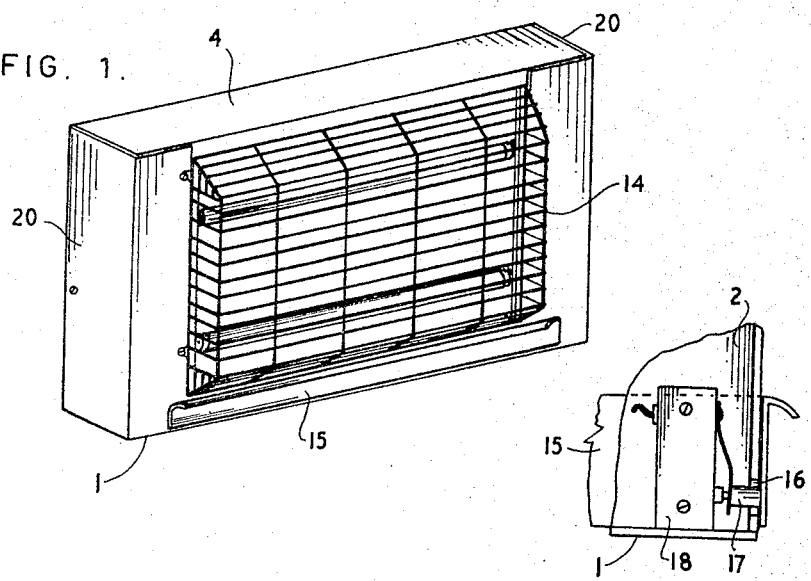

The present invention relates to an electrical exterminator for flying insects and more particularly to equipment adapted to be installed on a wall.

Electrical insect exterminators at present known are intended for installation by being suspended in the open space of a room or building corridor and permit access of insects from either side of the equipment.

Equipment of this kind is ordinarily employed in accordance with a system involving technical disposition of a number of units so as to minimise or prevent access of flies to a predetermined space. Such systems are not applicable to small scale insect trapping appropriate for retail butcher shops, and food suppliers generally.

The object of the present invention is to provide an effective electrical insect catcher suited for attachment to a wall and of relatively economical cost suitable for requirements of shop keepers purveying comestibles attractive to the attention of flies.

A further object of the invention is to provide an electrical insect catcher which operates effectively as a wall installation.

The electrical insect catcher in accordance with the present invention comprises an electrical exterminator for flying insects comprising a frame supporting a substantially vertical electrified grid extending over the area bounded by the said frame, and a source of light of short-wave characteristics attractive to flying insects but not harmful to human beings, and wherein the said electrified grid and the short-wave light source are supported from elements of the said frame which frame also supports both a cowling for housing the electrical activating apparatus and connections associated with the grid and the light source, and a removable tray or drawer for collecting insects killed by contact with the grid; characterised in this that the said frame also supports a reflective surface so shaped and arranged that light from the short-wave light source is reflected and scattered so as to pass through the electrified grid in such manner as to attract flying insects into physical contact with the grid whereby they will be electrocuted.

The invention is now more fully described with reference to a preferred embodiment illustrated in the accompanying drawings.

In the drawings—

Figure 4:
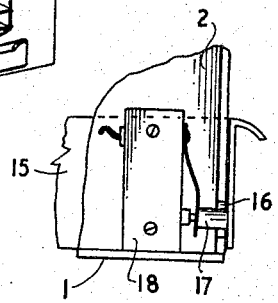
Figure 2:
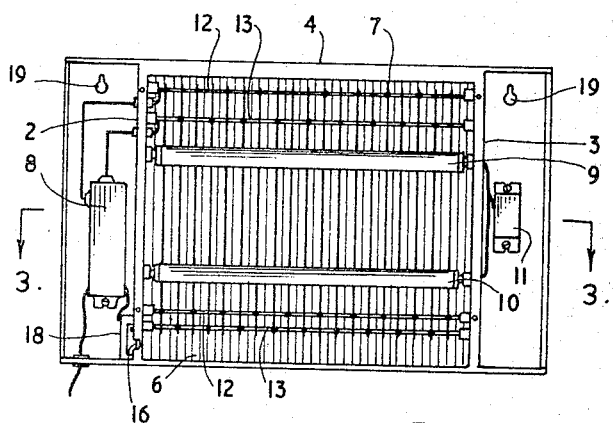
Figure 3:
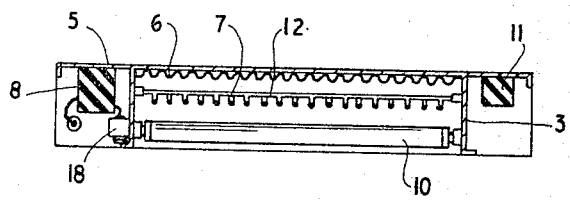

FIGURE 1 is a general perspective view of a preferred form of the equipment; and FIGURE 2 is a front elevation with end covers and protective guard removed; and FIGURE 3 is a transverse sectional view along the line 3—3 in FIGURE 2; and FIGURE 4 is a fragmentary view of a drawer actuated switch The illustrated embodiment constitutes a unit particularly adapted for wall mounting and comprises frame elements comprising a base 1, end walls 2 and 3 and a top member 4.

Secured to the rear of the frame is a back wall member 5 to which is affixed a corrugated sheet aluminium reflector 6 in which the corrugations run vertically in relation to the base 1. Spaced forwardly of the reflector there is an electrified grid 7 comprising vertical parallel conductors in which alternating conductors are of opposite polarity and the said elements are so spaced that insects of the size of domestic flies will bridge said space and are destroyed by passage of an electrical charge through their bodies, but are sufficiently spaced to avoid arcing except through an insect. The electrified grid is connected by high tension leads to a transformer 8 fed from mains supply. A normal plug connection may be employed for connection to mains supply.

Forwardly of the electrified grid, spaced parallel discharge tubes 9 and 10 are provided furnishing a source of ultra-violet light having a substantial component of the light emitted of the order of 3,200 A.U. which has a marked attraction for insects. The discharge tubes are suitably connected to mains supply through a ballast 11 and the grid elements are alternately connected to upper and lower positive and negative conductors 12 and 13 carrying 3,500 volts at a low amperage of the order of one ampere.

The lower extremities of the grid members 7 are alternately supported by spaced insulated support members 12A, 13A.

The front of the frame assembly is open to be accessible to insects but is protected by a metal guard 14 to preclude accidental contact with the electrified grid by persons working in any area where the units are located.

Between the opposite end frame elements 2 and 3 and below the grid area is a removable drawer 15 which retains insect bodies which may thus be conveniently disposed. In one frame element a cut-away portion 16 provides access for a projecting insulating rod 17 located on the drawer front which impinges against and actuates a switch element 18. It will be appreciated that removal of the drawer switches off the current supplied to the grid and its replacement switches on the current thereby avoiding any possibility of accidental contact with the high voltage grid by personnel attending to the equipment.

The equipment may be secured to a wall by any suitable means but conveniently may be suspended from studs or pegs spaced to be correctly located with key hole slots 19 provided in the extended portions of the back wall member 5.

The end sections of the equipment housing the transformer 8 and ballast 11 respectively are encased by removable cover elements 20 secured for example by screws to the end frame elements.

The power employed may be varied having regard to the location and requirements of the particular installation and for example, 15, 20 and 40 watt ultra-violet emitting tubes may be employed either singlely or in groups.

In putting the equipment into effective use it is recommended that some study be made of the path of flies from say a shop door towards meat or other food displayed and the apparatus located in a convenient position so as to attract flies in advance of their being attracted by the displayed food.

The present equipment has been widely used and has proved most effective for destruction of insects and by way of example in a test where flies were admitted to a large room attracted by a meat display, it disposed of all flies over a period of 24 hours' continuous operation. The effectiveness of the present equipment is believed to be enhanced by the employment of a metal reflecting element in corrugated form which has high reflectance for ultra-violet light and achieves dispersal and projection of this light outwardly into a room from a wall attracts the attention of the insects to be destroyed.

It is to be appreciated that the precise form of the applicant's apparatus may be varied to suit requirements but all forms of the invention are characterised by having a metal reflector for ultra-violet light. Variations and modifications may accordingly be made without departing from the scope of the invention defined in the appendent claims.

I claim:

1. An electrical exterminator for flying insects comprising a frame supporting a substantially vertical electrified grid extending over the area bounded by the said frame, a source of light of short-wave characteristics attractive to flying insects but harmless to human beings on one side of the grid, and wherein the said electrified grid and the short-wave light source are supported from elements of the said frame, said frame also supporting both a cowling for housing the electrical activating apparatus and connections associated with the grid and the light source, and a removable tray for collecting insects killed by contact with the grid, said frame also supporting a corrugated sheet aluminum reflective surface on the other side of said grid so shaped and arranged that light from the short-wave light source is reflected and scattered so as to pass through the electrified grid to attract flying insects into physical contact with the grid whereby they will be electrocuted.

2. An electrical exterminator in accordance with claim 1, wherein the voltage applied to the electrified grid is in the range 3,000 to 5,000 volts and the amperage being between 0.5 to 1.5 amperes.

3. An electrical exterminator in accordance with claim 1, wherein the light emitted by the source of shortwave light is within the range 3,000 to 3,500 A.U.

4. An electrical exterminator according to claim 1, including a switch for controlling the current supply to the electrified grid and light source, and means for controlling said switch by said removable tray.

References Cited
UNITED STATES PATENTS

| | | | |
|---|---|---|---|
| 1,960,084 | 5/1934 | Folmer et al. | 43—112 |
| 2,165,560 | 7/1939 | Luther | 43—112 |
| 2,236,698 | 4/1941 | Rector | 43—139 |
| 2,475,181 | 7/1949 | Gardenhour | 43—112 |
| 2,893,161 | 7/1959 | Reid | 43—139 |
| 2,941,328 | 6/1960 | Streat | 43—112 |
| 2,951,310 | 9/1960 | Anderson et al. | 43—112 |

ALDRICH F. MEDBERY, *Primary Examiner.*